United States Patent
Wuerstlein et al.

(10) Patent No.: US 8,201,883 B2
(45) Date of Patent: Jun. 19, 2012

(54) ADJUSTING DEVICE FOR A HEADREST OF A MOTOR VEHICLE SEAT

(75) Inventors: Holger Wuerstlein, Zeil am Main (DE); Tobias Hofmann, Leinach (DE); Faouzi Khemiri, Bamberg (DE)

(73) Assignee: Brose Fahrzeugteile GmbH & Co. Kommanditgesellschaft, Hallstadt, Hallstadt (DE)

( * ) Notice: Subject to any disclaimer, the term of this patent is extended or adjusted under 35 U.S.C. 154(b) by 322 days.

(21) Appl. No.: 12/643,405

(22) Filed: Dec. 21, 2009

(65) Prior Publication Data

US 2010/0231023 A1    Sep. 16, 2010

(30) Foreign Application Priority Data

Dec. 20, 2008 (DE) .......................... 10 2008 064 348

(51) Int. Cl.
*B60N 2/42* (2006.01)

(52) U.S. Cl. .................. 297/216.12; 297/217.3; 701/49

(58) Field of Classification Search ............. 297/216.12, 297/217.3, 410; 307/9.1, 10.1; 701/49

See application file for complete search history.

(56) References Cited

U.S. PATENT DOCUMENTS

| | | | |
|---|---|---|---|
| 5,844,415 A | 12/1998 | Gershenfeld et al. | |
| 6,402,195 B1* | 6/2002 | Eisenmann et al. | 280/735 |
| 6,552,550 B2* | 4/2003 | Karray et al. | 324/662 |
| 6,746,078 B2* | 6/2004 | Breed | 297/216.12 |
| 7,145,263 B2* | 12/2006 | Nathan et al. | 307/10.1 |
| 7,794,012 B2* | 9/2010 | Szablewski | 297/216.12 |
| 7,894,960 B2* | 2/2011 | Farquhar et al. | 701/45 |
| 7,967,377 B2* | 6/2011 | Truckenbrodt et al. | 297/217.3 |
| 7,986,151 B2* | 7/2011 | Hirota et al. | 324/662 |
| 2006/0175881 A1 | 8/2006 | Akaike et al. | |
| 2007/0267909 A1 | 11/2007 | Truckenbrodt et al. | |
| 2010/0140992 A1* | 6/2010 | Yamaguchi | 297/217.3 |

FOREIGN PATENT DOCUMENTS

| | | |
|---|---|---|
| DE | 195 03 203 A1 | 8/1995 |
| DE | 199 16 804 C1 | 8/2000 |
| DE | 102 27 765 A 1 | 1/2004 |
| EP | 1 857 318 A2 | 11/2007 |
| FR | 2 884 775 A1 | 10/2006 |
| WO | WO 2008/133291 A1 | 11/2008 |

\* cited by examiner

*Primary Examiner* — Laurie Cranmer
(74) *Attorney, Agent, or Firm* — Muncy, Geissler, Olds & Lowe, PLLC

(57) ABSTRACT

An adjusting device for a headrest of a motor vehicle seat is specified. The adjusting device comprises, in a first variant, a capacitive proximity sensor integrated into or designed for integration into the headrest having at least three transmitting electrodes spaced apart vertically from one another and having a common receiving electrode. In a second variant of the adjusting device, the proximity sensor has at least three receiving electrodes spaced apart vertically from one another and has a common transmitting electrode. In both variants, the adjusting device also has an actuating drive for motorized vertical adjustment of the headrest relative to the vehicle seat, as well as a control unit. The control unit here is designed to drive the transmitting electrodes or transmitting electrode for emission of an alternating electric field to determine from the received electrical signals detected from the receiving electrode or the receiving electrodes, respective associated measured capacitance values that contain information about the capacitance produced between each of the transmitting electrodes or receiving electrodes and the common receiving electrode or transmitting electrode, and to drive the actuating drive to establish a vertical target position of the headrest relative to the head position of a vehicle occupant as a function of the measured capacitance values.

20 Claims, 6 Drawing Sheets

ADJUSTING DEVICE FOR A HEADREST OF A MOTOR VEHICLE SEAT

This nonprovisional application claims priority under 35 U.S.C. §119(a) to German Patent Application No. 10 2008 064 348.3, which was filed in Germany on Dec. 20, 2008, and which is herein incorporated by reference.

BACKGROUND OF THE INVENTION

1. Field of the Invention

The invention relates to an adjusting device for a headrest of a motor vehicle seat.

2. Description of the Background Art

A headrest in a motor vehicle seat typically serves to support the head of a vehicle occupant using the seat in the event of a crash, thereby avoiding rearward bending of the cervical spine. However, the increase in safety achieved through the headrest is only realized to its full extent when the headrest is adjusted to the right height relative to the head's vertical position, so that in the event of a crash the head essentially strikes a center of the headrest provided for this purpose. In contrast, an incorrectly adjusted headrest can result in injuries to the head and neck region in the event of a crash. In order to minimize the risk of head injury, for example cerebral concussion, when the head strikes the headrest, the headrest should also be located as close as possible to the vehicle occupant's head in the horizontal direction, but should nonetheless permit unhindered head movement.

For correct positioning of a headrest, it is typical to adjust the headrest relative to the seat back in a vertical direction and sometimes in a horizontal direction as well. In a high-quality motor vehicle seat, the adjustment is frequently motorized.

In order to avoid incorrect positioning of the headrest, a modern headrest adjusting device occasionally has associated with it a detector that senses the head position of a vehicle occupant relative to the associated headrest. Thus, for example, a headrest adjusting device known from EP 1 857 318 A2, which corresponds to U.S. Publication No. 20070267909, has associated with it a detector in the form of a capacitive proximity sensor integrated into the headrest. This proximity sensor comprises three electrodes that are arranged on the front side of the headrest spaced apart from one another in the vertical direction. The two outer electrodes here serve as transmitting electrodes for radiating an alternating electric field in a spatial region located in front of the headrest. The center electrode serves as a shared receiving electrode for measuring the capacitance produced between each of the transmitting electrodes and the receiving electrode. The prior art adjusting device uses the physical effect that the capacitance of the electrode arrangement due to the presence of the head in the alternating electric field changes in a characteristic manner. The deviation of the headrest position from a predefined vertical target position relative to the head of the vehicle occupant is determined by comparison of the capacitance values associated with each of the two transmitting electrodes. The headrest position at which these capacitance values are identical is detected as the target position for the headrest here.

Similar headrest adjusting devices, each having a capacitive proximity sensor comprising three electrodes for detecting the head position, are also known from FR 2 884 775 A1 and DE 199 16 804 C1, which corresponds to U.S. Pat. No. 6,402,195.

SUMMARY OF THE INVENTION

It is therefore an object of the present invention to provide a headrest adjusting device. In an embodiment, the headrest adjusting device can have a capacitive proximity sensor that is integrated into the headrest, or is designed for integration into the headrest, wherein this proximity sensor can have at least three transmitting electrodes spaced apart vertically from one another and has a common receiving electrode. The term "vertical" here relates to the intended installation situation of the proximity sensor in a motor vehicle.

The adjusting device can also include an actuating drive for motorized adjustment of the headrest in the vertical direction relative to the vehicle seat and a control unit for driving the actuating drive in accordance with a head position of a vehicle occupant using the vehicle seat as sensed by the proximity sensor. The control unit here can be designed using circuitry and/or programming to carry out a control process wherein the transmitting electrodes are driven to transmit an alternating electric field, wherein received electrical signals sensed by the receiving electrode are used to determine respective associated capacitance values that contain information about the measured capacitance value produced between each of the transmitting electrodes and the receiving electrode, and wherein the actuating drive is driven in accordance with these measured capacitance values to establish a vertical target position of the headrest relative to the head position.

In another embodiment, in place of the at least three transmitting electrodes for the proximity sensor, at least three receiving electrodes can be spaced apart vertically from one another. In place of the common receiving electrode, a common transmitting electrode can be provided according to the second inventive variant.

The two embodiments described above are essentially equivalent with regard to the underlying physical principles and the effect intended in accordance with the invention. In particular, exchanging the transmitting and receiving electrodes has no effect, other than a change of arithmetic sign, on the characteristics of the alternating electric field propagating in the spatial region in front of the headrest as a result of the proximity sensor.

As a result of the electrode arrangement of the proximity sensor, system-caused misadjustments of the headrest, which cannot be ruled out in the prior art adjusting devices, are reliably avoided. Specifically, whereas a proximity sensor that incorporates only three electrodes detects only body parts of the vehicle occupant whose distance from the sensor arrangement is extreme (i.e., maximal or minimal) by comparing the capacitances produced between these electrodes, the electrode arrangement also makes it possible to sense whether the vehicle occupant's body region opposite the sensor has a convex or concave curvature. This, in turn, makes it possible to unambiguously distinguish the desired target position, where the center of the headrest is set approximately at the height of the (convex shaped) head of the vehicle occupant, from an undesired headrest position where the headrest is set approximately at the height of the (concave shaped) neck of the vehicle occupant.

According to an embodiment of the invention, the at least three transmitting electrodes, can be driven in a sequential manner, i.e. using a time-multiplexing method. The overall received signal received by the receiving electrode is thus divided into individual received signals, clearly separated in time, each of which is associated with a specific transmitting electrode. From each of these individual received signals, the capacitance produced between the receiving electrode and the associated transmitting electrode can be calculated in a particularly simple manner. In the case of the second inventive variant, it is useful for the single transmitting electrode there to be driven continuously or in a periodically pulsed manner to radiate the alternating electric field. In this case, each of the at least three receiving electrodes sends a separate received signal to the control unit, from which signals the capacitance produced between the associated receiving electrode and the common transmitting electrode can in turn be calculated. Each of the receiving electrodes is preferably read out at the same time. However, the receiving electrodes can also be read out in a time-sequenced manner to simplify the readout circuit implemented in the control unit.

For reasons of simplicity, further embodiments are described below in detail only for the first inventive variant. However, each of these embodiments can also be correspondingly applied within the scope of the invention to the second inventive variant, realizing the advantages described below. For application to the second inventive variant, the terms "transmitting electrode" and "receiving electrode" in the text below should be interchanged accordingly.

In order to permit an especially simple numerical analysis of the received signals, the electrodes of the inventive proximity sensor should preferably be spatially arranged in relation to one another such that all transmitting electrodes have the same spacing from the common receiving electrode. In an especially useful solution, this is achieved in that the common receiving electrode is formed by a vertically elongated electrode area that extends at least largely over the vertical region of the headrest surface occupied by all of the transmitting electrodes. Optionally, however, the common electrode area can also include multiple such electrode areas that are short-circuited to one another.

The electrode area, or every electrode area, of the common receiving electrode can flank the at least three transmitting electrodes on the outside. However, for achieving an especially long sensing range, an alternative sensor arrangement has proven especially advantageous in which each of the at least three transmitting electrodes is divided into two electrode areas positioned at the same height and spaced horizontally from one another, with the common receiving electrode extending between them—in particular, approximately in the center. This sensor arrangement is considered to be an independent invention, not dependent on the other features of the headrest adjusting device.

In order to be able to determine the target position of the headrest in an especially simple and precise manner using the received signals, it is useful to arrange at least two of the transmitting electrodes symmetrically in the vertical direction with respect to the center of the headrest, i.e., above and below the headrest. Within the control process implemented by the control unit, the measured capacitance values associated with these transmitting electrodes, and at least one other measured capacitance value, are analyzed in a comparative manner to recognize the reaching of the vertical target position.

Through the comparison of the measured capacitance values of the two symmetrically arranged transmitting electrodes, the control unit here usefully detects a headrest position with an extreme, i.e., maximal or minimal, distance from the center to the vehicle occupant in that the values of these two measured capacitance values cross at this position, i.e. take on the same value. Whether the spacing between the vehicle occupant and the center of the headrest in this headrest position is minimal or maximal, hence whether the body region located opposite the center of the headrest is convex or concave, is usefully detected by the value of the third measured capacitance value in comparison to the values of the measured capacitance values that are crossing. The headrest position is only accepted as the target position here if the result of this analysis is that the distance between the vehicle occupant and the center of the headrest is minimal in this headrest position.

In order to move the headrest to the target position rapidly but precisely without having the headrest overshoot the target position to a noteworthy extent, the speed of actuation of the actuating drive is preferably reduced continuously or in multiple steps as part of the control process implemented in the control unit even before the target position is reached.

In a first embodiment of this variant method, the associated proximity sensor has more than three, in particular five, transmitting electrodes arranged spaced apart vertically from one another. The speed of travel of the actuating drive here is then reduced by a predefined amount by the control unit when the measured capacitance values of two adjacent transmitting electrodes cross.

Alternatively or in addition hereto, provision is optionally made that within the control process, the control unit reduces the speed of travel of the actuating drive when the measured capacitance value of one of the at least three transmitting electrodes exceeds an extreme value, i.e. a minimum or maximum.

In an embodiment of the control process implemented in the control unit, the control unit first checks whether the head of a vehicle occupant is located within the detection range of the proximity sensor at all. For example, for this purpose the control unit performs what is known as a search run, in which, with the headrest moving vertically, a measured capacitance value, preferably all measured capacitance values, are continuously or periodically compared to a stored threshold that indicates the presence of the vehicle occupant in the detection area of the proximity sensor. Alternatively, the change of one or more measured capacitance values can also be sensed over the adjustment range of the headrest for this purpose, and on the basis of this change a conclusion can be drawn as to the presence or absence of a vehicle occupant in the detection area of the proximity sensor. In accordance with the method, the control unit always adjusts the headrest to a stored default target position when no head position can be detected in the entire actuation range of the headrest. In particular, this default target position is what is called a 2/3 position, in which the headrest is extended upward to approximately two thirds of its vertical adjustment range. This 2/3 position has proven to be the optimal adjustment of the headrest for the average vehicle occupant. Thus, in the 2/3 position, an at least acceptable protective effect is achieved for most vehicle occupants even without occupant-specific adjustment of the headrest. The setting of the 2/3 position in the case of a failure to detect a head position in accordance with this paragraph is also considered to be an independent invention, even in the absence of the other features of the adjusting device.

The headrest is preferably a four-way headrest, which can be adjusted both in the vertical and horizontal directions, thus up, down, forward, and backward. The terms "vertical" and "horizontal" here are to be understood as approximations of the direction of adjustment of the headrest. In particular, the vertical direction of adjustment of the headrest is approximately parallel to the orientation of the back of the vehicle seat, and can thus also be inclined slightly from the vertical of the surrounding space. The horizontal direction of adjustment of the headrest is, in particular, approximately perpendicular to the vertical direction of adjustment, and can thus also be tilted slightly relative to the horizontal direction of the surrounding space. An angle between the horizontal direction of adjustment and the vertical direction of adjustment that deviates slightly from 90° can be formed. The horizontal degree of freedom of actuation of the headrest can also be produced by tilting of the headrest about a horizontal axis.

For driving the four-way headrest, the adjusting device preferably has an additional actuating drive with which the headrest, i.e. at least a front surface of the headrest intended to face the vehicle occupant, can be adjusted horizontally. In this regard, within the control process implemented in the control unit, the additional actuating drive is preferably driven to adjust a horizontal target position of the headrest after adjustment of the vertical target position of the headrest. This horizontal target position is determined here through comparison of at least one measured capacitance value with a stored threshold value. To this end, the control unit employs, in particular, a measured capacitance value that is associated with a transmitting or receiving electrode that is centrally located, in particular approximately in the center of the headrest.

The measured capacitance values of the capacitive proximity sensor also exhibit a certain dependence on the horizontal headrest position, i.e. without the presence of a vehicle occupant. The reason for this system-caused dependence is, in particular, metal components of the headrest. Such metal components, together with the electrodes of the proximity sensor, produce stray capacitances whose magnitudes change with the horizontal movement of the headrest as a result of the changing spacing from the electrodes of the proximity sensor.

To eliminate, or at least reduce, these interfering quantities, a metallic, in particular grounded, shield can, as is already known per se from EP 1 857 318 A2, be provided behind the electrodes of the proximity sensor within the scope of the inventive proximity sensor. However, experiments have shown that such a shield disadvantageously limits the detection range of the proximity sensor.

Preferably, therefore, the system-caused dependence of the measured capacitance value, or of each measured capacitance value, used to establish the horizontal target position is or are numerically compensated. To that end, the aforementioned measured capacitance value is normalized by the control unit, in particular to a stored system characteristic that reproduces the system-caused behavior of the measured capacitance value as a function of the horizontal headrest position, hence that behavior that is unaffected by a vehicle occupant.

For rapid but precise driving to the horizontal target position, a useful embodiment of the control process by the control unit thus reduces the speed of actuation of the additional actuating drive continuously or in multiple steps upon approaching the horizontal target position. The control unit controls the speed of actuation here, in particular using a comparison of the measured capacitance value with multiple graduated thresholds, where the speed of actuation of the additional actuating drive is always discontinuously reduced in steps when the measured capacitance value falls below one of these thresholds.

All of the above-described method aspects of the invention are thus considered to be independent inventions in and of themselves, in particular independently of their automated performance by the control unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Corresponding parts and quantities are provided with the same reference symbols in all figures.

Figure 1:
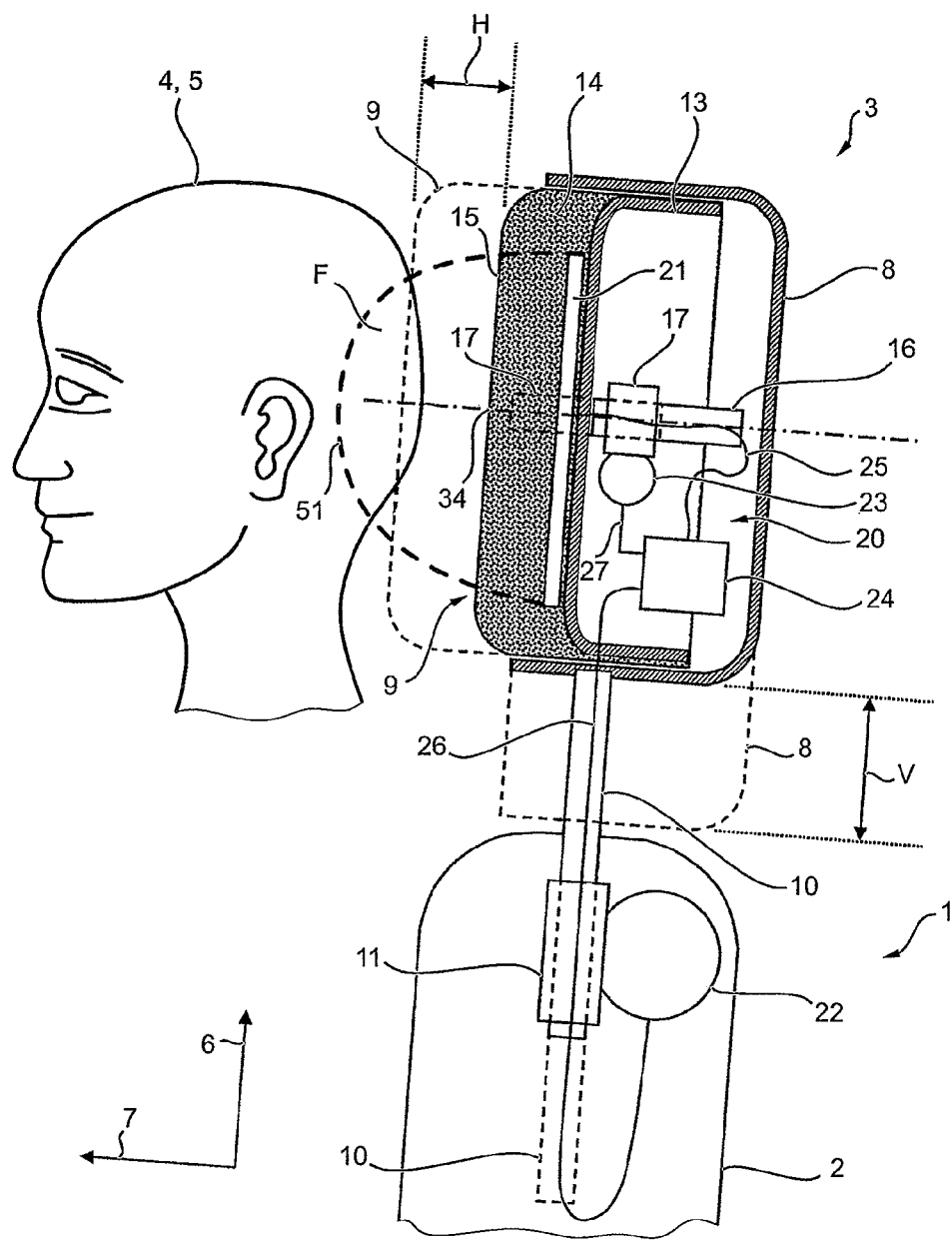
FIG. 1 in a generalized schematic cross-section, illustrates a head of a vehicle occupant and a headrest with an associated adjusting device, which comprises a capacitive proximity sensor, a control unit, a vertical actuating drive for adjusting the vertical headrest position, and a horizontal actuating drive for adjusting the horizontal headrest position, FIG. 2 in a schematic block diagram, illustrates a first embodiment of the adjusting device according to FIG. 1, FIG. 3 in a simplified schematic block diagram, illustrates a control unit of the adjusting device according to FIG. 2, FIG. 4 in two vertically arranged diagrams, illustrates the behavior of five measured capacitance values of the proximity sensor as a function of the vertical headrest position (upper diagram) and the behavior of the speed of actuation of the vertical actuating drives set as a function of these measured quantities (lower diagram), FIG. 5 in a schematic side view, illustrates the head of the vehicle occupant and the headrest positioned at head height, as well as a schematic diagram of the comparative values of the measured capacitance values determined in this position, FIG. 6 in a representation according to FIG. 5, illustrates the head and the headrest, positioned at neck height here, as well as the comparative values of the measured capacitance values determined in this position, FIG. 7 in three vertically arranged diagrams, illustrates the behavior of a measured capacitance value in the presence of a head as a function of the horizontal headrest position, as well as a corresponding (system) characteristic of the system-caused dependence of the measured capacitance value on the horizontal headrest position (upper diagram), the behavior of the same measured capacitance value in the presence of the head, normalized to the system characteristic (center diagram), as well as the behavior of the speed of actuation of the horizontal actuating drive set as a function of this normalized measured capacitance value (lower diagram), FIG. 8 in a representation according to FIG. 2, illustrates a second embodiment of the adjusting device, FIG. 9 in a representation according to FIG. 3, illustrates the control unit of the adjusting device according to FIG. 8, and FIG. 10 to 12 illustrate various additional embodiments of the proximity sensor.

FIG. 1 shows a simplified schematic representation of a (vehicle) seat 1, of which only the upper part of a seat back 2 is shown in cross-section. FIG. 1 also shows a headrest 3, mounted on the seat back 2, for the head 4 of a vehicle occupant 5 using the seat 1. The seat 1 is, in particular, the driver or front passenger seat of a passenger car.

The headrest 3 is a so-called 4-way-headrest, which is adjustable relative to the seat 1 in both a vertical direction 6 and a horizontal direction 7. The terms "vertical" and "horizontal" here are to be interpreted as "coarse-grained" terms for approximately specifying the directions of adjustment. In particular, the vertical direction 6 is oriented approximately parallel to the longitudinal extension of the seat back 2, and is slightly inclined, together with the latter, from the spatial vertical. The horizontal direction 7 is correspondingly oriented approximately perpendicular, and in the installed state of the headrest 3 extends approximately parallel to the longitudinal direction of the vehicle. In the following, the vertical direction 6 is assumed to be oriented upward, and the horizontal direction 7 as being oriented forward, with the terms "up," "down," "forward" and "backward" relating to the intended installed situation of the headrest 3 in the motor vehicle. Accordingly, the side of the headrest 3 that faces the head 4 of the vehicle occupant 5 is designated as the forward or front side.

The headrest 3 comprises an approximately bowl-shaped back part 8 of metal and/or a sturdy plastic and a front part 9 held therein. Attached to the back part 8 are two supporting rods 10 extending in the vertical direction 6, with which the headrest 3 is anchored to the seat back 2. By means of the supporting rods 10, the headrest 3 is guided in a headrest retainer 11 of the seat back 2 such that it can be displaced in the vertical direction 6.

The front part 9 of the headrest 3 comprises a carrier shell 13, which in particular is made up of a sturdy plastic part. The carrier shell 13 carries a padding 14 on its front side. A covering 15 of textile material, leather, or the like, which forms the outer skin of the headrest 3 on its front side, is in turn placed on the padding 14.

The front part 9 of the headrest 3 is guided on the back part 8 so as to be displaceable in the horizontal direction 7. This guide is provided, e.g., by means including a gear rack 16 fastened to the front part 8 that runs in a retainer 17 of the back part 8.

FIG. 1 shows the headrest 3 at the upper end of its vertical adjustment range V and at the back end of its horizontal adjustment range H. The opposite positions of the back part 8 at the lower end of the vertical adjustment range V and of the front part 9 at the forward end of the horizontal adjustment range H are indicated by dashed lines in FIG. 1. The headrest position is continuously adjustable within the vertical adjustment range V and the horizontal adjustment range H.

For adjusting the headrest 3, an adjusting device 20 is associated therewith. This comprises a capacitive proximity sensor 21, a (vertical) actuating drive 22 for vertical adjustment of the headrest 3, a (horizontal) actuating drive 23 for horizontal adjustment of the headrest 3, and a control unit 24.

The proximity sensor 21 is located inside the headrest 3 between the carrier shell 13 and the padding 14. Alternatively, however, it can also be located between the padding 14 and the covering 15, and thus directly under the front surface of the headrest 3.

The actuating drive 22 is located inside the seat back 2 and acts on the supporting rods 10 of the headrest 3 in a manner known per se. The actuating drive 23 is located in the interior of the headrest 3 and acts together with the gear rack 16 for adjustment of the front part 9 relative to the back part 8.

The control unit 24, preferably also located in the headrest 3, is connected to the proximity sensor 21 or the actuating drive 22 or the actuating drive 23 via data lines 25, 26 and 27. The data line 26 here is routed out of the headrest 3 into the seat back 2 through one of the supporting rods 10. Also routed through one of the supporting rods 10 are supply lines (not shown in detail) for supplying electricity to the actuating drive 23 and the control unit 24.

Figure 2:
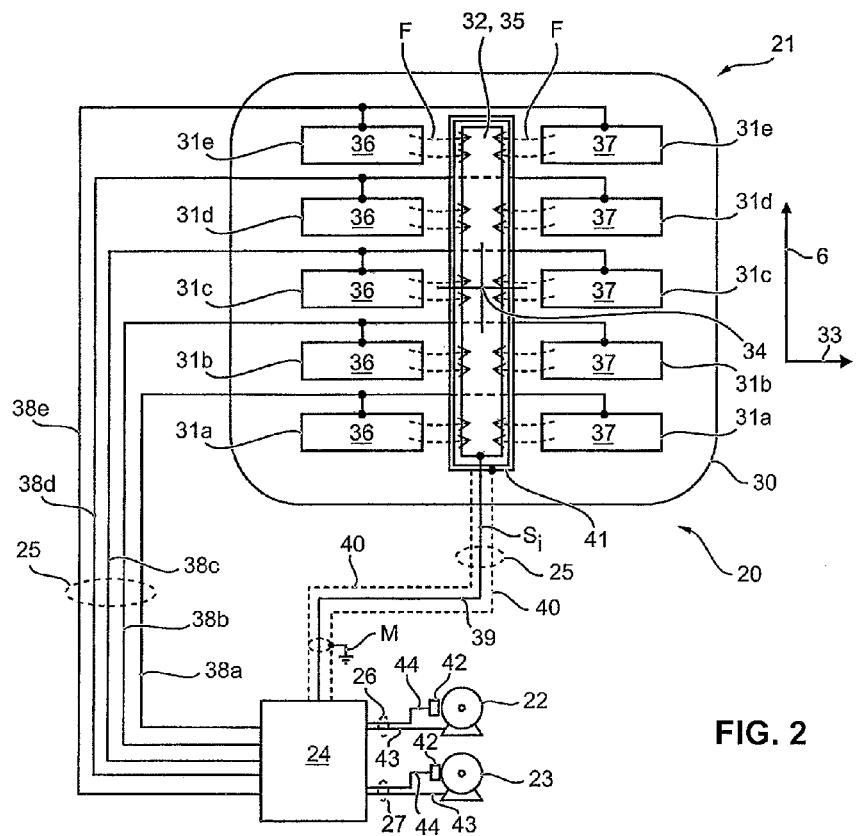

FIG. 2 shows a first embodiment of the adjusting device 20 in greater detail. As is evident from this representation in combination with FIG. 1, the proximity sensor 21 comprises a flat carrier 30. Mounted on the carrier is an electrode arrangement consisting of five transmitting electrodes 31a to 31e, and a common receiving electrode 32. The carrier 30 is made of a plastic film, preferably flexible. The electrodes 31a to 31e and 32 are made of metal films, preferably also flexible, which are, e.g., glued onto the carrier 30. Alternatively, the electrodes 31a to 31e and 32 can also be applied to the carrier 30 in the form of a coating.

The carrier 30 extends over a primarily flat region of the headrest 3 in both the vertical direction 6 and a vehicle direction 33 transverse thereto. In particular, the carrier 30 is located approximately centered on a center 34 of the headrest 3 on which the head 4 is intended to impact in the case of a crash.

The electrodes 31a to 31e and 32 are in turn distributed over a majority of the surface of the carrier 30. The receiving electrode 32 here is formed by an electrode area 35 in the form of an elongated strip that is centered on the carrier in the transverse vehicle direction 33 and extends over the entire height region occupied by the transmitting electrodes 31a to 31e in the vertical direction 6. Each of the transmitting electrodes 31a to 31e is divided into two electrode areas 36 and 37 that are short-circuited to one another, where the electrode areas 36 and 37 of the same transmitting electrode 31a to 31e each extend left or right of the receiving electrode 32 in the transverse vehicle direction 33 at the same vertical height. The electrode areas 36 and 37 of the different transmitting electrodes 31a to 31e are each stacked one above the other in the vertical direction, aligned and spaced apart from one another. The electrode areas 36 and 37 of the transmitting electrode 31a are at the bottom here, the electrode areas 36 and 37 of the transmitting electrode 31e are located at the top. The transmitting electrode 31c is located approximately centered with the center 34 in the vertical direction. The same vertical spacing is present between the adjacent transmitting electrodes 31a and 31b, or 31b and 31c, or 31c and 31d, or 31d and 31e. In addition, all electrode areas 36 and 37 of the different transmitting electrodes 31a to 31e always have the same spacing from the receiving electrode 32.

Each of the transmitting electrodes 31a to 31e is separately connected to the control unit 24 through an individual line 38a to 38d within the data line 25. The receiving electrode 32 is also connected to the control unit 24 through an individual line 39 within the data line 25. In order to avoid parasitic capacitances in the data line 25, the individual line 39 is electrically shielded by what is known as a guard shield 40 in the form of a conductor, held at ground potential M, that surrounds the individual line 39—in particular coaxially. The guard shield 40 is short-circuited to a ground input of the control unit 24. In addition, the guard shield 40 may also be connected to an—optionally provided—guard electrode 41 that surrounds the receiving electrode 32 in a ring.

As is also evident from FIG. 2, each of the actuating drives 22 and 23 has a Hall sensor 42 associated with it. Each of the Hall sensors 42, in cooperation with a ring magnet (not shown) coupled to the shaft of the respective actuating drive 22 or 23, generates a measurement signal, with which it is possible to calculate state quantities of the respective actuating drive 22 or 23, such as, e.g., the rotary position, speed, and actuating distance traveled. Accordingly, each of the data lines 26 and 27 comprises, in addition to a control line 43 for driving the respective actuating drive 22 or 23, a measurement line 44 for feeding the Hall signal back to the control unit 24.

Figure 3:
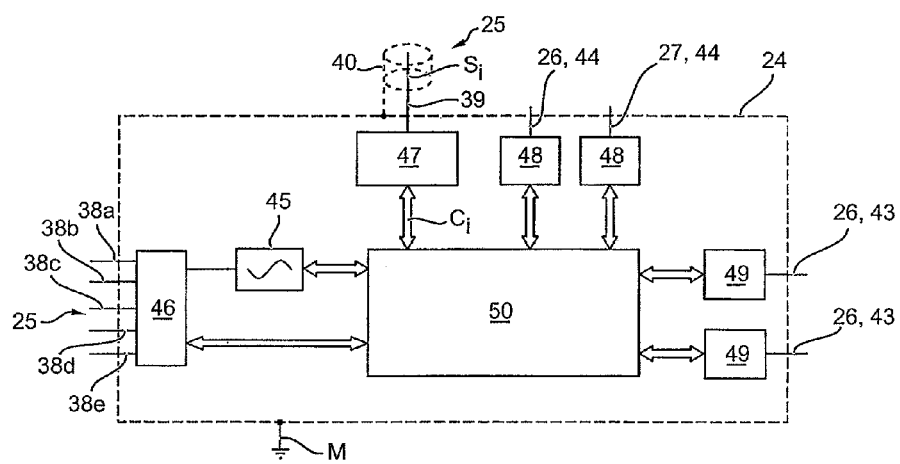

The control unit 24 of the adjusting device 20 according to FIG. 2, shown in greater detail in FIG. 3, comprises a frequency generator 45, a time multiplexer 46, (a capacitance) measurement module 47, two Hall modules 48, each for driving one of the Hall sensors 42 and analyzing the returned Hall signals, and two motor controllers 49, each for driving one of the actuating drives 22 and 23. The control unit 24 also comprises a microcontroller 50, which has control connections to the frequency generator 45, the time multiplexer 46, the measurement modules 47, the Hall modules 48, and the motor controllers 49.

Implemented in the microcontroller 50 by software means is a control program (described in detail below) that, to summarize, senses the position of the head 4 relative to the current headrest position by driving the proximity sensor 21 and moves the headrest 3 into a (vertical and horizontal) target position driving the actuating drives 22 and 23 in accordance with the detected head position.

The control process implemented in the microcontroller 50 is started, for example, by starting the motor vehicle engine. Provision is optionally made that the control process can also be started during operation of the motor vehicle at regular intervals and/or at the request of the vehicle user (by pressing a corresponding control button, for example).

In a first phase of the control process, the vertical target position of the headrest 3 is set first. To this end, the control unit 24 first carries out a search run. At the start of the search run, the headrest 3 is located at the lower end of its vertical adjustment range V and at the back end of its horizontal adjustment range H. If this is not the case, the headrest 3 is moved to this position by the control unit 24.

Proceeding from there, the microcontroller 50 drives the actuating drives 22 by means of the appropriate motor controller 49, causing the headrest 3 to move upward. In this process, the microcontroller 50 causes the frequency generator 45 to generate an AC voltage with a frequency of approximately 10 MHz, which is output through the time multiplexer 46 in a time-sequenced manner to each of the transmitting electrodes 31a to 31e of the proximity sensor 2.

Under the influence of this voltage, the transmitting electrodes 31a to 31e each alternately generates an alternating electric field F in a spatial region in front of the headrest 3. In this alternating electric field F, each of the transmitting electrodes 31a to 31e functions electrically in combination with the receiving electrode 32 as a capacitor, whose capacitance is measured by the measurement module 47.

As a result of the sequential driving of the transmitting electrodes 31a to 31e, the electrical signal produced in the receiving electrode 32 as a result of the alternating electric field F is divided into received signals $S_i$ (i=1, 2 ..., 5) clearly separated in time, each of which is associated with one of the transmitting electrodes 31a to 31e. In the following, the received signal $S_1$ is defined as being associated with the transmitting electrode 31a, the received signal $S_2$ is defined as being associated with the transmitting electrode 31b, the received signal $S_3$ is defined as being associated with the transmitting electrode 31c, the received signal $S_4$ is defined as being associated with the transmitting electrode 31d, and the received signal $S_5$ is defined as being associated with the transmitting electrode 31e.

From each of these received signals $S_i$, the measurement module 47 calculates an associated measured capacitance value $C_i$ (i=1, 2, ... 5), and continuously outputs these measured capacitance values $C_i$ to the microcontroller 50. The measured capacitance values $C_i$ are, in general, arbitrary measured quantities from which the capacitance produced between the associated transmitting electrode 31a to 31e and the receiving electrode 32 can be calculated. In the variant of the control process described below, the measured capacitance values $C_i$ are in particular quantities that are inversely proportional to the respective capacitance.

If the head 4 of the vehicle occupant 5 is within a detection range 51 (indicated by dashed lines in FIG. 1) of the proximity sensor 21 during the search run, the head 4 affects the capacitances produced between the transmitting electrodes 31a to 31e and the receiving electrode 32. This results, firstly, from the fact that the head 4 acts as a dielectric in the alternating electric field F, resulting in an increase in the particular capacitance in question. The second cause of the effect of the head 4 is that, due to the ionic mobility in the human body and the grounding of the human body that is always present to some degree, the head 4 acts as a counter electrode, resulting in a decrease in the measurable capacitances between the transmitting electrodes 31a to 31e and the receiving electrode 32. As a general rule, the latter effect predominates. Accordingly, the magnitudes of the measured capacitance values $C_i$, being invers proportional to the respective capacitance, increase as the head approaches the associated transmitting electrode 31a to 31e.

Figure 4:
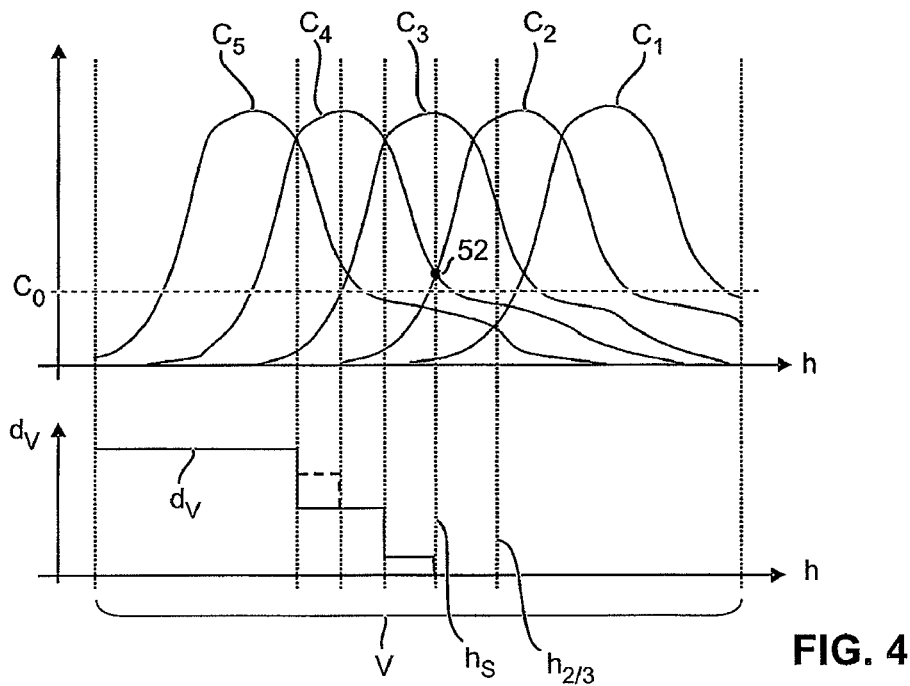

This effect is utilized during the search run to test whether a head position can be detected at all. To this end, each of the measured capacitance values $C_i$ is compared with a stored threshold value $C_0$ (FIG. 4). If all measured capacitance values $C_i$ over the entire vertical adjustment range V are below the threshold value $C_0$, this is interpreted as an indication that no head 4 is within the detection range 51. In this case, the headrest 3 is moved forward in the horizontal direction 7, whereupon the search run is repeated. If no head position can be identified over the entire adjustment range H and vertical adjustment range V, the control unit 24 moves the headrest 3 into the so-called 2/3 position, in which the headrest 3 is extended upward by approximately two thirds of the vertical adjustment range V. A corresponding value $h_{2/3}$ of the vertical headrest position h is indicated schematically in FIG. 4. In the 2/3 position, the headrest 3 is retracted to the back end of the horizontal adjustment range H.

Otherwise, if the head 4 of a vehicle occupant 5 is located within the detection range 51, each measured capacitance value $C_1$ to $C_5$ passes through a characteristic maximum during the vertical travel of the headrest 3 (cf. FIG. 4). The maximum of the measured capacitance value $C_3$ here corresponds to the vertical target position $h_S$, which is to say the vertical headrest position h at which the center 34 of the headrest is located at the minimum distance from the head 4 in the vertical direction 6, and this is located at approximately the same height as the eye-to-ear line of the head 4 (see FIG. 1).

Since it is known that the determination of the maximum of the measured capacitance value $C_3$ is associated with a relatively large measurement error as a result of measurement noise, the reaching of the target position $h_S$ is not determined using the measured capacitance value $C_3$, but instead is determined more precisely using the measured capacitance values $C_2$ and $C_4$ associated with the transmitting electrodes 31b and 31c. Specifically, as is evident from FIG. 4, the target position $h_S$ thus also coincides approximately with the crossing point 52 of the measured capacitance values $C_2$ and $C_4$.

Figure 5:
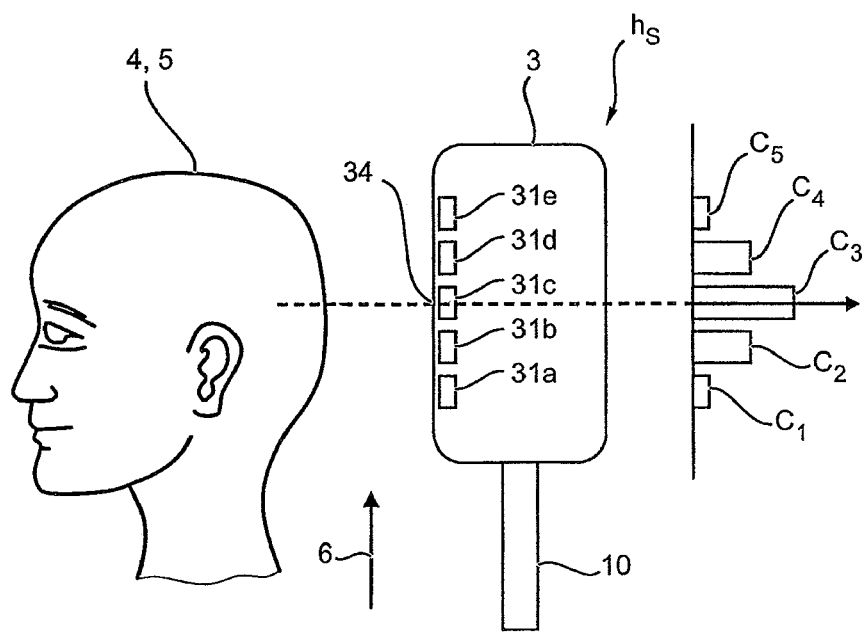
Figure 6:
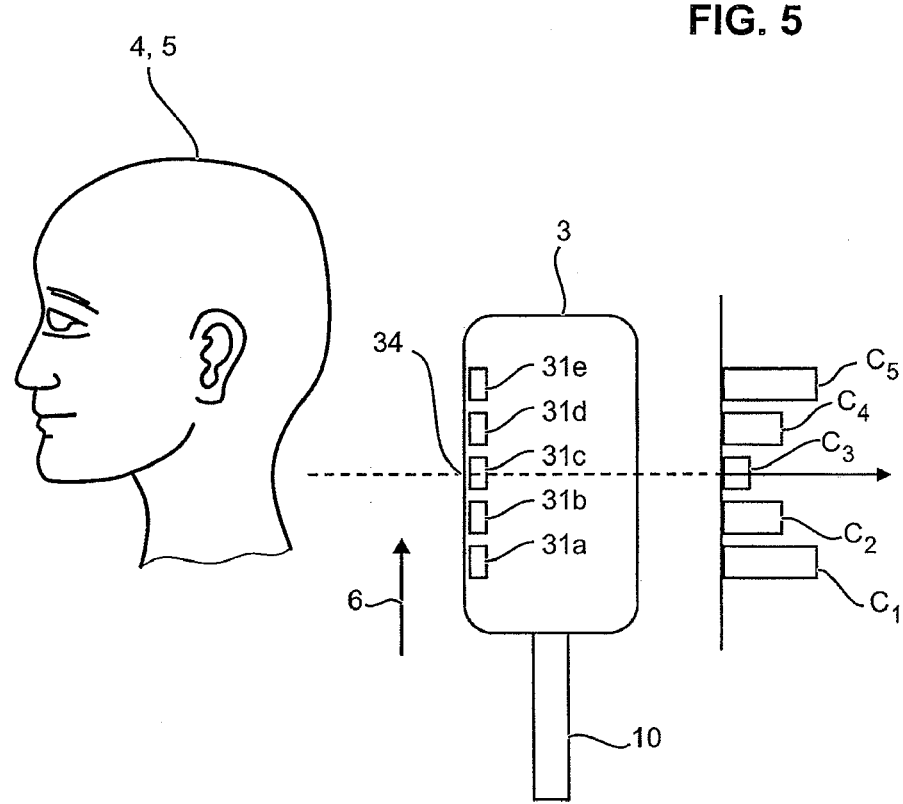

It is known, however, that the crossing of the measured capacitance values $C_2$ and $C_4$ is a necessary but not sufficient criterion for the reaching of the target position $h_S$. Instead, as a comparison of FIGS. 5 and 6 shows, a crossing of the measured capacitance values $C_2$ and $C_4$ also takes place when the center 34 of the headrest 3 is erroneously adjusted in the vertical direction 6 to the neck region of the vehicle occupant 5 (FIG. 6). In order to distinguish between the target position $h_S$ and an erroneous adjustment of the headrest 3 to the neck of the vehicle occupant 5, the measured capacitance value $C_3$ associated with the center transmitting electrode 31c is also analyzed in the control process implemented in the microcontroller 50. As a comparison of FIGS. 5 and 6 shows, the value of this measured capacitance value $C_3$ at the target position $h_S$ is larger than the values of the measured capacitance values $C_2$ and $C_4$, while precisely the opposite is true in the case of an incorrect adjustment of the headrest 3 to the neck region of the vehicle occupant 5.

In a useful embodiment of the control process, the control unit 24 detects the arrival at the target position $h_S$ in the context of the foregoing discussions in that, as the headrest 3 is moved upward, the conditions $C_4 < C_2$ and $C_3 > C_4$ are simultaneously satisfied. As soon as these conditions are met, the control unit 24 accordingly switches the actuating drive 22 off.

To prevent the headrest 3 from "overshooting" the vertical target position $h_S$ on approach, the microcontroller 50 successively reduces the speed of actuation $d_V$ of the actuating drive 22 in multiple steps, even before reaching the target position $h_S$, by appropriately driving the motor controller 49 associated with the actuating drive 22 in accordance with the speed values supplied by the associated Hall module 48. As is evident from FIG. 4, a first reduction of the speed of actuation $d_V$ takes place when the measured capacitance value $C_5$ associated with the top transmitting electrode 31e crosses the measured capacitance value $C_4$ associated with the next-lower transmitting electrode 31d. The speed of actuation $d_V$ is reduced again when the measured capacitance value $C_4$ crosses the measured capacitance value $C_3$. In order to achieve an actuating motion of the headrest 3 that is as "soft," i.e. free of jolts, as possible, the speed of actuation $d_V$ is optionally reduced again when the measured capacitance value $C_4$ exceeds the maximum (see dashed line in the lower diagram of FIG. 4).

After establishing the vertical target value $h_S$, the microcontroller 50 adjusts a horizontal target position $I_S$ in a second phase of the control process. To determine the target position $I_S$, the microcontroller 50 starts a horizontal search run while driving the actuating drive 23, in the course of which the front part 9 of the headrest 3 is moved toward the head 4. During this process, the microcontroller 50 monitors the behavior of the measured capacitance value $C_3$ shown in the upper diagram of FIG. 7.

To numerically compensate stray capacitances resulting from metallic components of the headrest 3, the microcontroller 50 normalizes the measured capacitance value $C_3$ to a system characteristic K, which reproduces the system-caused dependence of the measured capacitance value $C_3$ on the horizontal headrest position. The system characteristic K is stored in the microcontroller 50 in the form of a list of points, between which the microcontroller 50 interpolates. Alternatively, the system characteristic K can also be stored in the form of an approximated modeling function. The behavior of a correspondingly normalized measured capacitance value $C'_3 = C_3/K$ is shown in the center diagram of FIG. 7.

Figure 7:
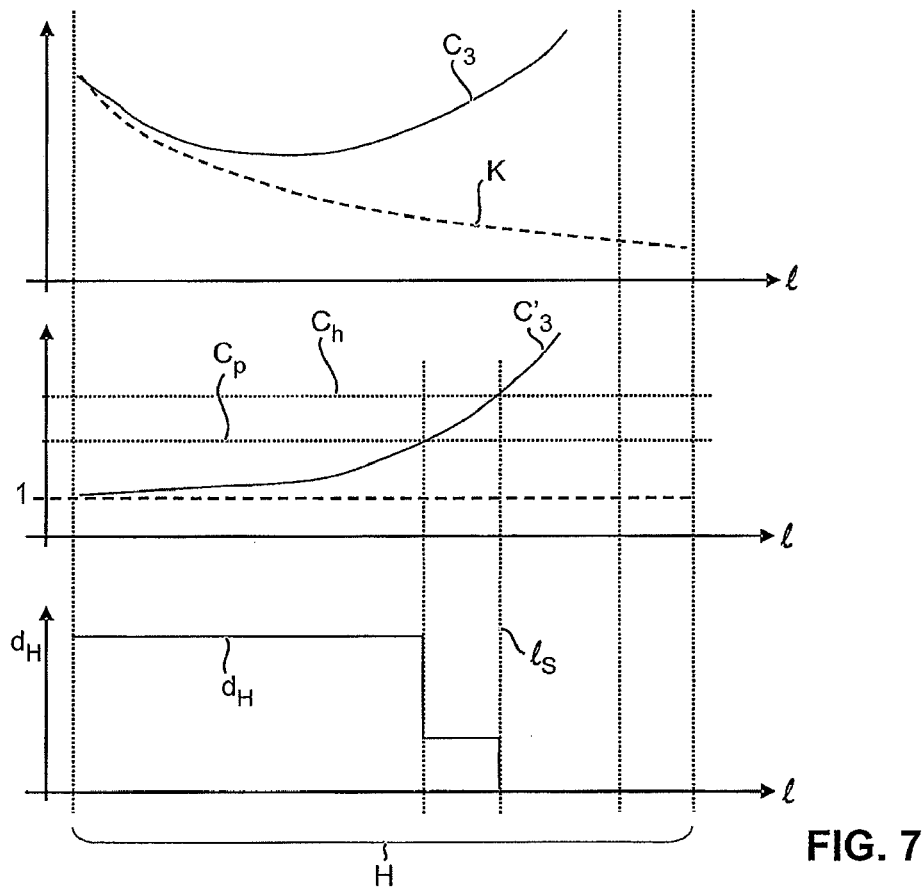

To determine the horizontal target position $I_S$, the microcontroller 50 compares the normalized measured capacitance value $C'_3$ with a stored threshold value $C_h$ and switches the actuating drive 23 off when this threshold value $C_h$ is exceeded (see lower diagram in FIG. 7).

To prevent the headrest 3 from "overshooting" the target value $I_S$ during the horizontal adjustment, the microcontroller 50 also reduces the speed of actuation $d_H$ of the actuating drive 23 in a stepwise fashion, before the target position $I_S$ is reached. The speed of actuation $d_H$ is reduced here when the normalized measured capacitance value $C'_3$ exceeds a threshold value $C_p$ that is lowered from the threshold value $C_h$ (see FIG. 7).

Figure 8:
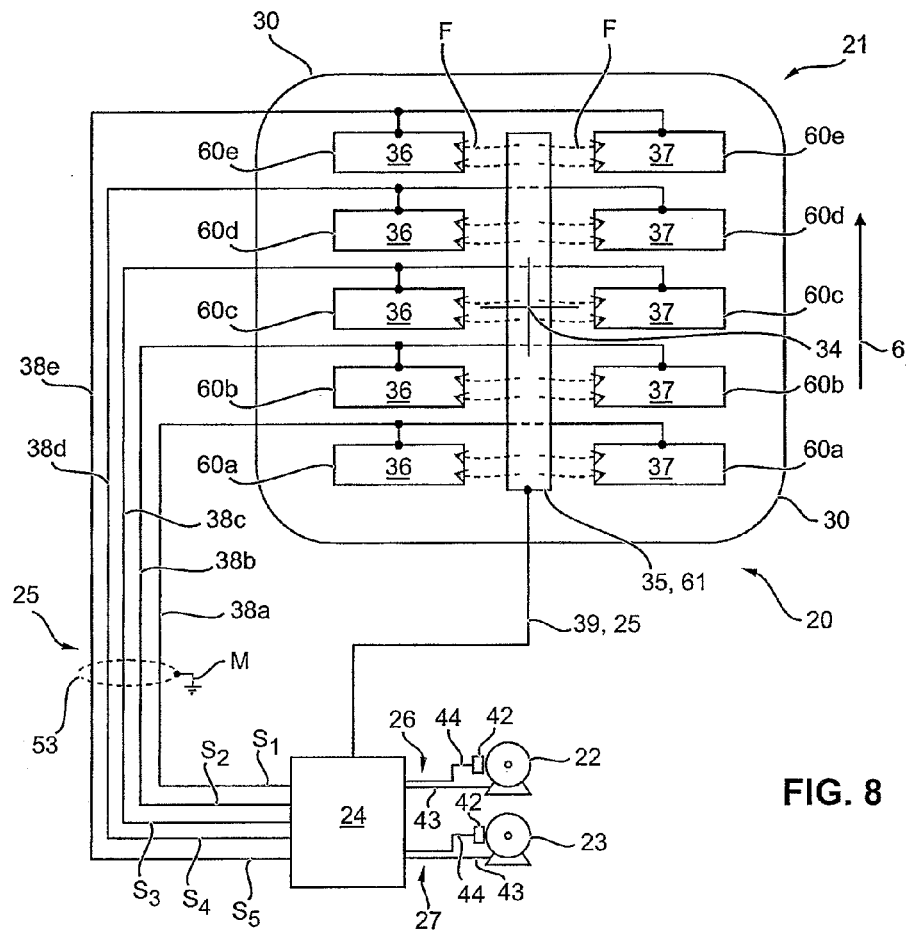

FIG. 8 shows a second embodiment of the adjusting device 20. Except as otherwise described below, this embodiment is the same as the embodiment of the adjusting device 20 described in conjunction with FIG. 2. However, in place of the transmitting electrodes 31a to 31e there, according to FIG. 8 five receiving electrodes 60a to 60e are provided—with the same geometric arrangement of electrode areas 36 and 37 on the carrier 30. In place of the receiving electrode 32 from the embodiment according to FIG. 2, according to FIG. 8 a common transmitting electrode 61—with the same geometric arrangement of the associated electrode area 35—is provided. A shielding of the individual line 39 is not required here. The guard electrode 41 shown in FIG. 2 can likewise be omitted. In its place, the individual lines 38a to 38e, which connect the control unit 24 to the receiving electrodes 60a to 60e here, are preferably electrically shielded—in particular individually. A suitable shield 53 is indicated schematically in FIG. 8.

Figure 9:
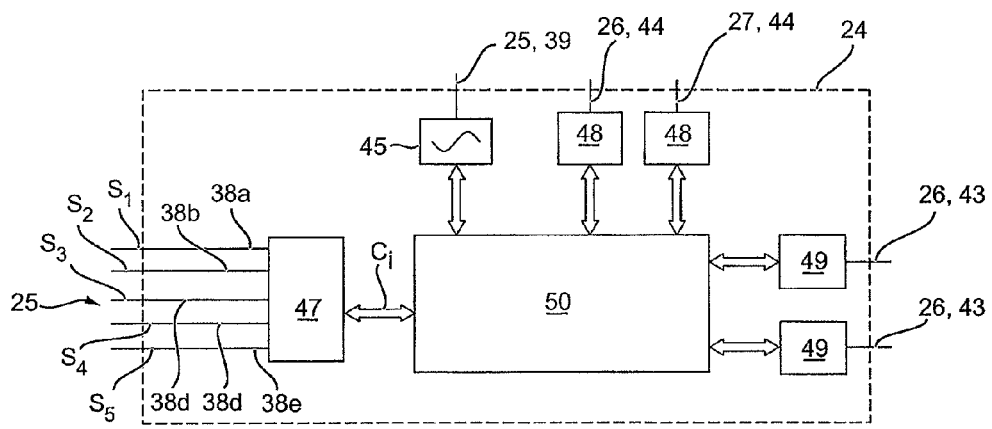

The reversed electrode function as compared to FIG. 2 is accomplished through a modified embodiment of the control unit 24 according to FIG. 9. In contrast to FIG. 3, the capacitance measurement module 47 here is wired to the receiving electrodes 60a to 60e through the individual lines 38a to 38e. This measurement module 47 is designed to simultaneously sense the received signals $S_1$ to $S_5$ that are separately received through the individual lines 38a to 38e here. The time multiplexer 46 of the embodiment according to FIGS. 8 and 9 is not needed. The frequency generator 45—in another difference from the FIG. 3—is connected to the transmitting electrode 61 via the individual line 39.

Aside from these differences, the method of operation of the control unit 24 according to FIG. 9 corresponds to the embodiment described above. In particular, the control process described above is also implemented in the microcontroller 50 according to FIG. 9.

Figure 10:
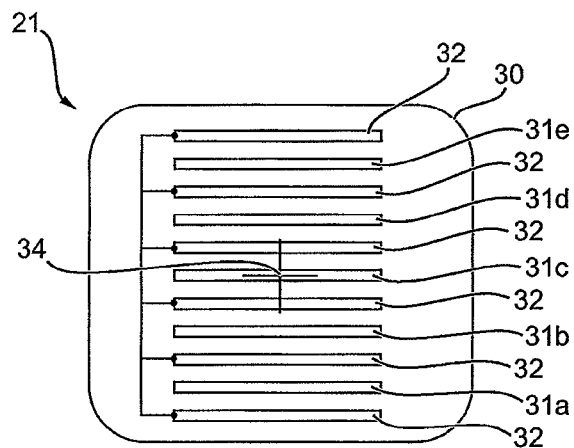
Figure 11:
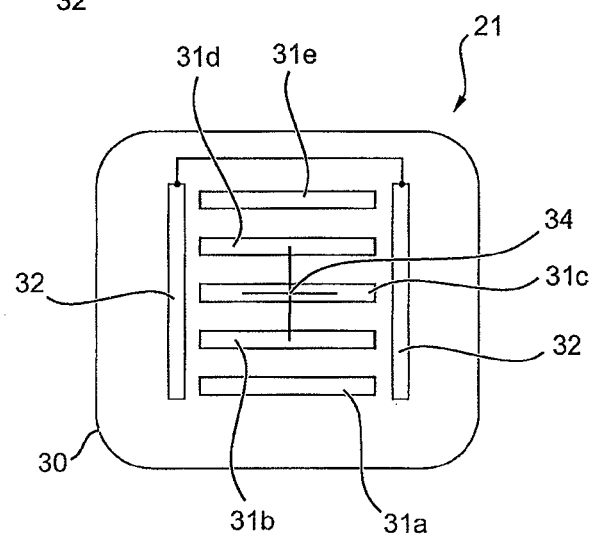
Figure 12:
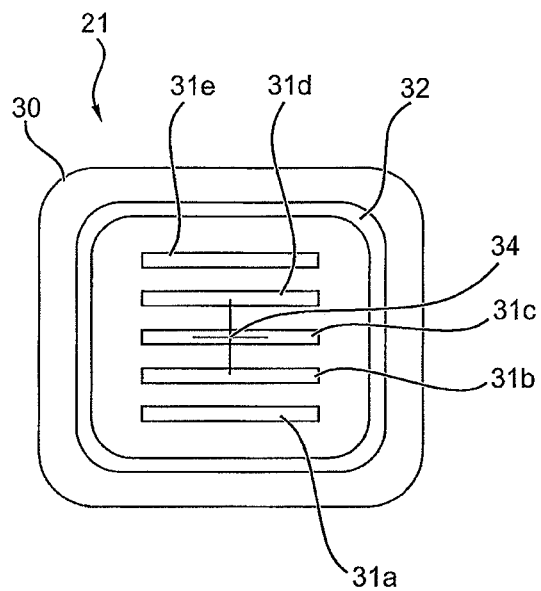

Lastly, FIG. 10 to 12 show variants of the proximity sensor 21 with electrode configurations different from FIG. 2. In all of the variants of the proximity sensor 21 shown here, the transmitting electrodes 31a to 31e can also be used as receiving electrodes 60a to 60e, and the common receiving electrode 32 can also be used as a common transmitting electrode 61.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An adjusting device for a headrest of a motor vehicle seat, the adjusting device comprising:
   a capacitive proximity sensor integrated into or configured to be integrated into the headrest, the capacitive proximity sensor having at least three transmitting electrodes spaced apart vertically from one another and having a common receiving electrode;
   an actuating drive configured to vertically adjust the headrest relative to the vehicle seat; and
   a control unit configured:
      to drive the transmitting electrodes for emission of an alternating electric field;
      to determine, from received electrical signals detected from the receiving electrode, respective associated measured capacitance values that contain information regarding a capacitance produced between each of the transmitting electrodes and the receiving electrode; and
      to drive the actuating drive to establish a vertical target position of the headrest relative to a head position of a vehicle occupant as a function of the measured capacitance values.

2. The adjusting device according to claim 1, wherein the control unit is configured to drive the at least three transmitting electrodes sequentially in time.

3. An adjusting device for a headrest of a motor vehicle seat, the adjusting device comprising:
- a capacitive proximity sensor integrated into or configured to be integrated into the headrest, the capacitive proximity sensor having at least three receiving electrodes spaced apart vertically from one another and having a common transmitting electrode;
- an actuating drive configured to vertically adjust the headrest relative to the vehicle seat; and
- a control unit configured:
    - to drive the transmitting electrode for emission of an alternating electric field;
    - to determine, from received electrical signals detected from the receiving electrodes, respective associated measured capacitance values that contain information regarding a capacitance produced between each of the receiving electrodes and the transmitting electrode; and
    - to drive the actuating drive to establish a vertical target position of the headrest relative to a head position of a vehicle occupant as a function of the measured capacitance values.

4. The adjusting device according to claim 1, wherein all transmitting electrodes have the same spacing from the common receiving electrode.

5. The adjusting device according to claim 4, wherein the common receiving electrode is formed by at least one electrode area elongated in a vertical direction that extends over a vertical region of the headrest surface occupied by all of the transmitting electrodes.

6. The adjusting device according to claim 5, wherein each of the at least three transmitting electrodes comprises two electrode areas positioned at a same vertical height and spaced horizontally from one another, between which the common receiving electrode extends.

7. The adjusting device according to claim 1, wherein two of the at least three transmitting electrodes are located symmetrically above and below a center of the headrest on which a head of the vehicle occupant is intended to impact in the vertical target position, and wherein the control unit is configured to identify arrival at the target position by a comparison of the measured capacitance values associated with these two transmitting electrodes while taking into account at least one third measured capacitance value.

8. The adjusting device according to claim 1, wherein the control unit is configured to reduce a speed of actuation of the actuating drive continuously or in multiple steps upon approach of the headrest to the target position.

9. The adjusting device according to claim 8, wherein the proximity sensor comprises more than three, in particular five, transmitting electrodes or receiving electrodes spaced apart vertically from one another, and wherein the control unit configured to reduce a speed of travel of the actuating drive in steps when the magnitudes of measured capacitance values associated with adjacent transmitting electrodes or receiving electrodes cross.

10. The adjusting device according to claim 8, wherein the control unit configured to reduce the speed of actuation of the actuating drive when a measured capacitance value exceeds a threshold value.

11. The adjusting device according to claim 1, wherein the control unit is configured to adjust a position of the headrest to a stored default target position when no head position is detected in an entire actuation range of the headrest.

12. The adjusting device according to claim 1, further comprising an additional actuating drive for horizontal adjustment of the headrest, wherein the control unit is configured to drive the additional actuating drive to set a horizontal target position of the headrest in accordance with a comparison of at least one measured capacitance value with a stored threshold value after adjustment of the vertical target position.

13. The adjusting device according to claim 12, wherein the control unit is configured to numerically compensate a system-caused dependence on the horizontal headrest position of the measured capacitance value that is used for setting the horizontal target position.

14. The adjusting device according to claim 13, wherein the control unit is configured to normalize for numerical compensation the measured capacitance value that is used for setting the horizontal target position to a stored system characteristic as a function of the horizontal headrest position.

15. The adjusting device according to claim 12, wherein the control unit is configured to reduce the speed of actuation of the additional actuating drive continuously or in multiple steps upon approaching the horizontal target position.

16. The adjusting device according to claim 3, wherein all receiving electrodes have the same spacing from the common transmitting electrode.

17. The adjusting device according to claim 16, wherein the common transmitting electrode is formed by at least one electrode area elongated in a vertical direction that extends over a vertical region of a headrest surface occupied by all of the receiving electrodes.

18. The adjusting device according to claim 17, wherein each of the at least three receiving electrodes comprises two electrode areas positioned at a same vertical height and spaced horizontally from one another, between which the common transmitting electrode extends.

19. The adjusting device according to claim 3, wherein two of the at least three receiving electrodes are located symmetrically above and below a center of the headrest on which a head of the vehicle occupant is intended to impact in the vertical target position, and wherein the control unit is configured to identify arrival at the target position by comparison of the measured capacitance values associated with these two receiving electrodes while taking into account at least one third measured capacitance value.

20. The adjusting device according to claim 3, wherein the proximity sensor comprises more than three, in particular five, receiving electrodes spaced apart vertically from one another, and wherein the control unit configured to reduce a speed of travel of the actuating drive in steps when the magnitudes of measured capacitance values associated with adjacent receiving electrodes cross.

* * * * *